INVENTOR
OIVA E. HILL
BY
Lewis M Smith Jr.
ATTORNEY

Dec. 17, 1968     O. E. HILL     3,416,263

MACHINE TOOL

Filed Dec. 14, 1964     3 Sheets-Sheet 2

INVENTOR.
OIVA E. HILL
BY
*Lewis M. Smith, Jr.*
ATTORNEY

United States Patent Office 3,416,263
Patented Dec. 17, 1968

3,416,263
MACHINE TOOL
Oiva E. Hill, Holden, Mass., assignor to Norton Company, Worcester, Mass., a corporation of Massachusetts
Filed Dec. 14, 1964, Ser. No. 418,091
3 Claims. (Cl. 51—101)

ABSTRACT OF THE DISCLOSURE

Apparatus supporting a cantilevered workpiece in a chuck mounted at one end of a single elongated rotating spindle supported in self-aligning bearings upon spaced independently movable coaxially pivoted rocker arms and oscillated cyclically by cams spaced lengthwise along, encircling, and secured to the spindle.

---

The invention relates to machine tools and particularly to grinding machines for grinding cam contours. Grinding machines of this general type are disclosed in U.S. Patents Nos. 2,279,902, 2,599,987 and 2,723,500. The grinding machines disclosed in these patents are of the type having a head stock spindle and a footstock spindle. Means are provided for grinding cam contours differing from end to end as for example an elliptical-shaped piston having an end to end taper or drop along certain of its surfaces.

In the case of such a piston, it is common for the surfaces defined by the ends of the elongated cross sectional axes of the elliptical contour, which can be called the opposite sides of the piston, to be straight from end to end of the piston, the drop being provided over the curvilinear surfaces extending between such opposite sides.

This is achieved by providing means for oscillating the center axis of the work, i.e. the piston, toward and away from the grinding wheel about a pivot point located on an extension of such center axis, each oscillation being completed over a half turn of the work, i.e., over one half turn of the driving spindle rotating the work. The pivot point about which the work is oscillated is either near the driven center of the grinding machine, that is, the center of the foot stock, or the driving center, i.e., the center of the head stock.

An object of the present invention is to provide an improved machine tool, particularly an improved cam grinding machine, for producing cam contours differing from end to end and utilizing a chuck to hold the work.

The use of a chuck in accordance with the present invention eliminates the necessity of a foot stock. The chuck can be more readily loaded with the correct angular orientation of the work using an automatic loader, as compared to the use of a head stock and foot stock between which the work is held.

In accordance with the present invention, the work is oscillated in the desired manner by oscillating the chuck driving spindle in a novel and unique manner which provides important advantages.

The spindle is oscillated by means of (1) a plurality of oscillatable rocker arms rotatably supporting the spindle at spaced points along the axis of the spindle and (2) a plurality of cam means spaced along the axis of the spindle. In this way the spindle is oscillated in a predetermined manner about an imaginary point lying on an extension of the axis of the spindle.

In a preferred embodiment, the rocking arms rock about the axis of a rocking bar or shaft on which the rocking arms are mounted for rocking movement, as aforesaid.

Since the oscillations are about an imaginary pivot point rather than a pivot point in the machine, there is no structural limitation as to where the pivot point can be located and, consequently, a greater flexibility and variation in the amount of drop can be achieved for any given machine structure.

This greater flexibility is achieved with an extremely simple driving mechanism much less complex than that described in the above patents and with the use of a single unitary spindle and only two spindle bearings.

Furthermore, it is achieved without the necessity of dividing the spindle into a number of parts interconnected by universal couplings so that run-out of the work piece is avoided.

Moreover, the single chuck supporting spindle and two rocking arms form a closely coupled configuration in which flexural problems with resultant errors are reduced to a minimum.

An important advantage of the construction of the present invention is that it eliminates the necessity of the use of a foot stock and foot stock spindle for supporting the piece in grinding cam contours. Consequently, it eliminates the need for provision in the work piece of a center hole to engage the foot stock center and thereby avoids any possibility of misalignment at this point.

Furthermore, by means of the construction of the invention, the above advantages are achieved with the grooved end of the piston being held by the chuck, i.e., with the groved end of the piston being located furthermost from the oscillation pivot point.

Other objects and advantages of the invention will be apparent from the following description and accompanying drawings of a preferred embodiment of the invention. In the drawings:

FIG. 6 is a diagrammatic view showing how the spindle is oscillated to grind tapered ovals on pistons.

Figure 2:
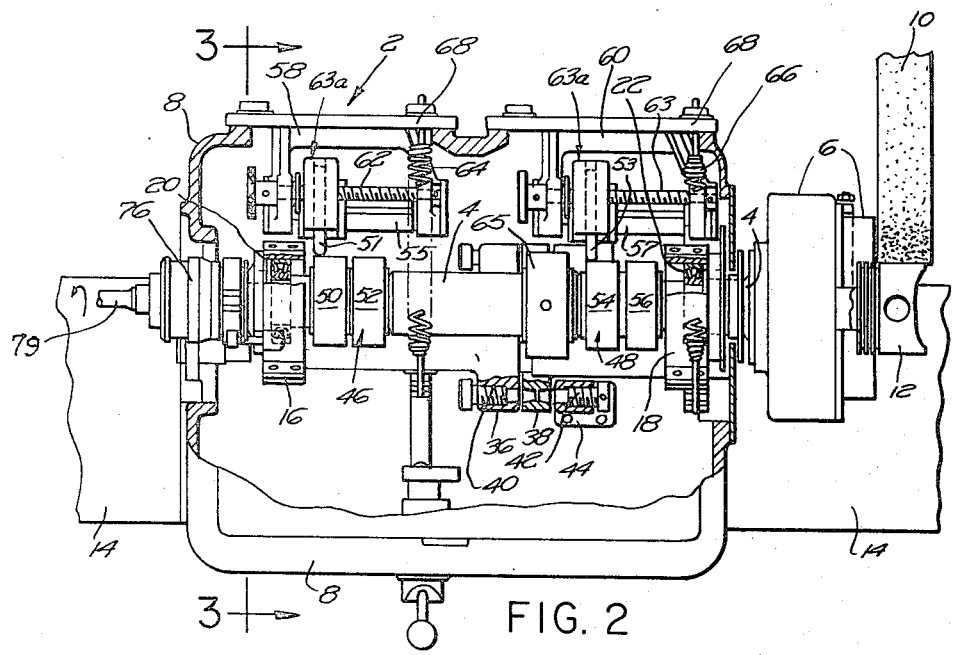
FIG. 2 is a plan view of the grinding machine of FIG. 1.
Figure 1:
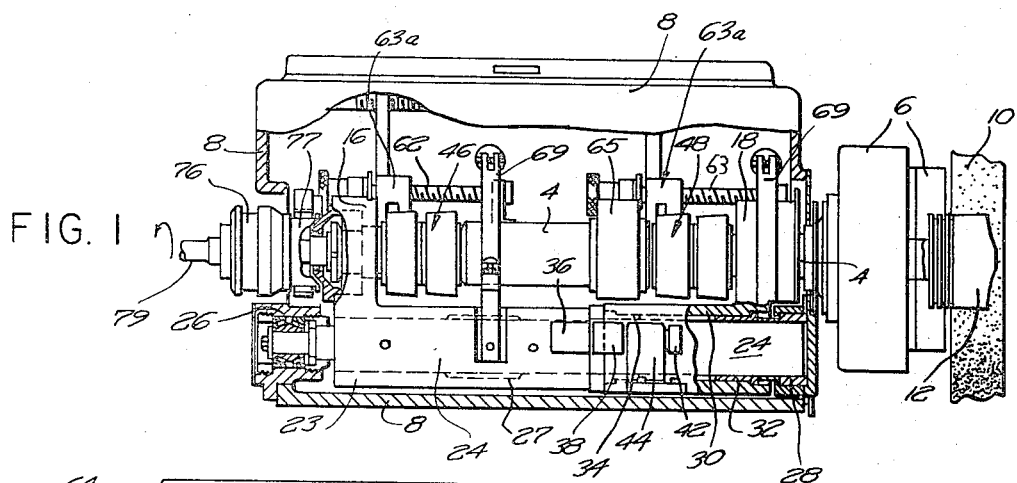
FIG. 1 is a front elevation of a part of a grinding machine embodying the invention.

With respect to the drawings, 2 represents a part of a cam grinding machine embodying the chuck supporting spindle 4 for driving the chuck 6, the mechanism for oscillating the spindle, the housing 8 therefor, the grinding wheel 10 and the work 12 which comprises a piston.

The base of the grinding machine is not shown and only a part of the work table 14 is shown in FIG. 2, such base and work table being conventional. The work table is arranged to slide relative to the base in conventional manner.

Furthermore, the transversely movable grinding wheel slide on which the grinding wheel is supported for rotation and sliding movement with respect to the work piece and the mechanism for rotating such wheel and for moving the grinding wheel slide, as aforesaid, are not shown since they are conventional.

The particular chuck 6 shown in the drawings is a hydraulic type chuck but the invention is applicable to chucks of any type. The grooved end of the piston 10 is held in the chuck, as shown.

The spindle 4 is rotatably supported on a pair of rocker arms 16 and 18 spaced along the axis of the spindle 4, as shown. Spindle 4 is rotatably mounted on rocker arms 16 and 18 by means of spherical self aligning bearings 20 and 22.

Rocker arm 16 extends into a sleeve 23 which is keyed at 27 to a coaxial rocker bar or shaft 24 rotatably mounted in housing 8 by means of thrust bearings 26 and 28. In this way, the rocking arm 16 may be rocked about the axis of the rocker shaft 24.

Rocker arm 18 extends into a sleeve 30 which is rotatably and concentrically mounted on rocker shaft 24 by means of bearings 32 and 34 for rocking movement of rocker arm 18 about the rocker shaft 24 independently of the rocker arm 16.

Each of the rocker arms 16 and 18 is in the form of a housing, as shown.

The sleeves 23 and 30 of the rocker arms have integral lugs 36 and 38, respectively, having aligned apertures as shown. The two rocker arms can be locked together for rocking movement together by means of screw 40, in which case the piston is given a nontapered eliptical shape.

Also rocker arm 18 can be locked against rocking by means of screw 42, which is threaded into a lug 44 attached to the housing 8. In such case, only the rocker arm 16 is operated for rocking motion.

Spindle 4 is provided with two sets of cams 46 and 48, respectively, keyed to the spindle and spaced along the axis of the spindle, as shown. Each set of cams is shown as having two cams 50 and 52 in the case of set 46, and 54 and 56 in the case of set 48. Each set may be replaced with only one cam. The advantage of using sets is that a greater variety of oscillations can be provided without taking apart the machine by using different cams in each set.

Thus, there is a set of cams for each rocker arm 16 and 18.

Cam set 46 is located close to rocker arm 16 and cam set 48 is located close to rocker arm 18. In this respect, it is noted that the rocker arms 16 and 18 are located closely adjacent to the ends of the spindle 4 within the housing 8. By spacing the rocking arms further apart, better control of spindle oscillation is achieved.

Each cam set 46 and 48 is provided with a cam follower 51 and 53 respectively, each cam follower being mounted on a pin or shaft 55 and 57, respectively, which is journaled at its ends in a bracket 58 and 60, respectively, attached to housing 8.

Each cam follower 51 and 53 can be adjusted axially along the spindle 4 by means of a threaded feed screw 62 and 63, respectively, threaded through a yoke member 63a and rotatably mounted in the bracket 58 and 60 respectively, whereby rotation of the feed screw 62 or 63 moves its yoke member 63a axially with respect to cam follower shaft 55 or 57, whichever the case may be. Each yoke member 63a has a pair of fingers 63b embracing the peripheral portion 63c of its cam follower, as shown, to permit rotation of the cam follower with respect to the yoke member. However, axial movement of the yoke member with respect to shaft 55 or 57 by feed screw 62 or 63 slides the cam follower axially along its shaft 55 or 57. Each cam follower is slidably mounted on its shaft 55 or 57 for rotation therewith. By adjusting the cam follower in this way, it can be adjusted to act on either of the cams in its set of cams to thereby vary the oscillation of the spindle 4. Also the cam surface of each cam may vary in an axial direction to provide a still greater variation in oscillation.

The cam sets 46 and 48 are urged against the cam followers 51 and 53 by means of tension springs 64 and 66, each of which is attached at one end to housing 8 by means of a fastening element 68. The other end of spring 64 is attached to rocker arm 16 by the lever system 69 and the other end of spring 66 is attached to rocker arm 18 by a corresponding lever system to thereby urge the cam sets 46 and 48 against their cam followers 51 and 53, respectively. The showing in the drawings does not include details of the arrangement for connecting a lever system 69 to each rocker arm, because such biasing means are well known in the art and may be substantially as shown in U.S. Patent No. 2,599,987.

Figure 3:
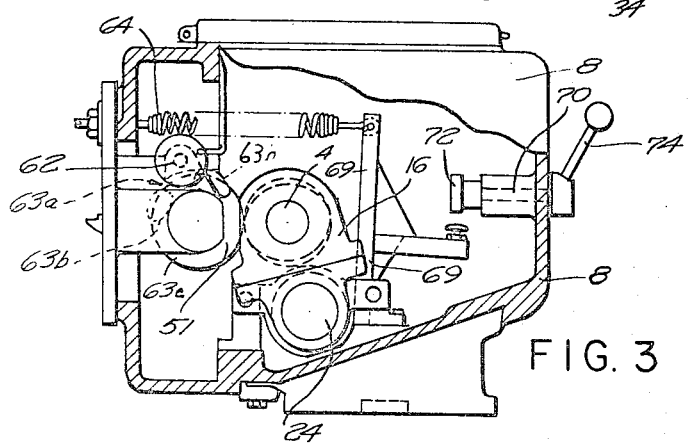
FIG. 3 is a section taken along the line 3—3 of FIG. 2.

While the cam followers are being moved and during servicing operations, each cam can be separated from its cam follower by means of a shaft 70, cam 72 and handle 74 (FIG. 3). By turning handle 74, cam 72 acts on the lever system 69 to release the force of the tension spring 64 or 66, whichever the case may be.

Spindle 4 is provided with a hydraulic fluid feeding device 65 to provide for the flow of hydraulic fluid to the hydraulic chuck through the passage 67 in the rotating spindle 4. The device 65 comprises a collar 71 rotatable with the spindle 4 and having a circumferential groove 71a communicating with the passage 67 and also with the nonrotated hydraulic fluid port 73.

The driven end of spindle 4 is bolted fast to the rotatable annular shaft extension 77 (FIG. 4) which is rotatably driven by shaft 79 through the flexible coupling, e.g. universal connection, 76. Drive shaft 79 is driven by a motor and driving arrangement in conventional manner to thereby drive the spindle 4. The universal coupling 76 permits oscillation of the spindle 4 and the drag brake 88 encircling the shaft extension 77 assures a stable rate of rotation.

Clearance is provided between the shaft extension 77 and the housing 8 to permit oscillation of the spindle.

Figure 4:
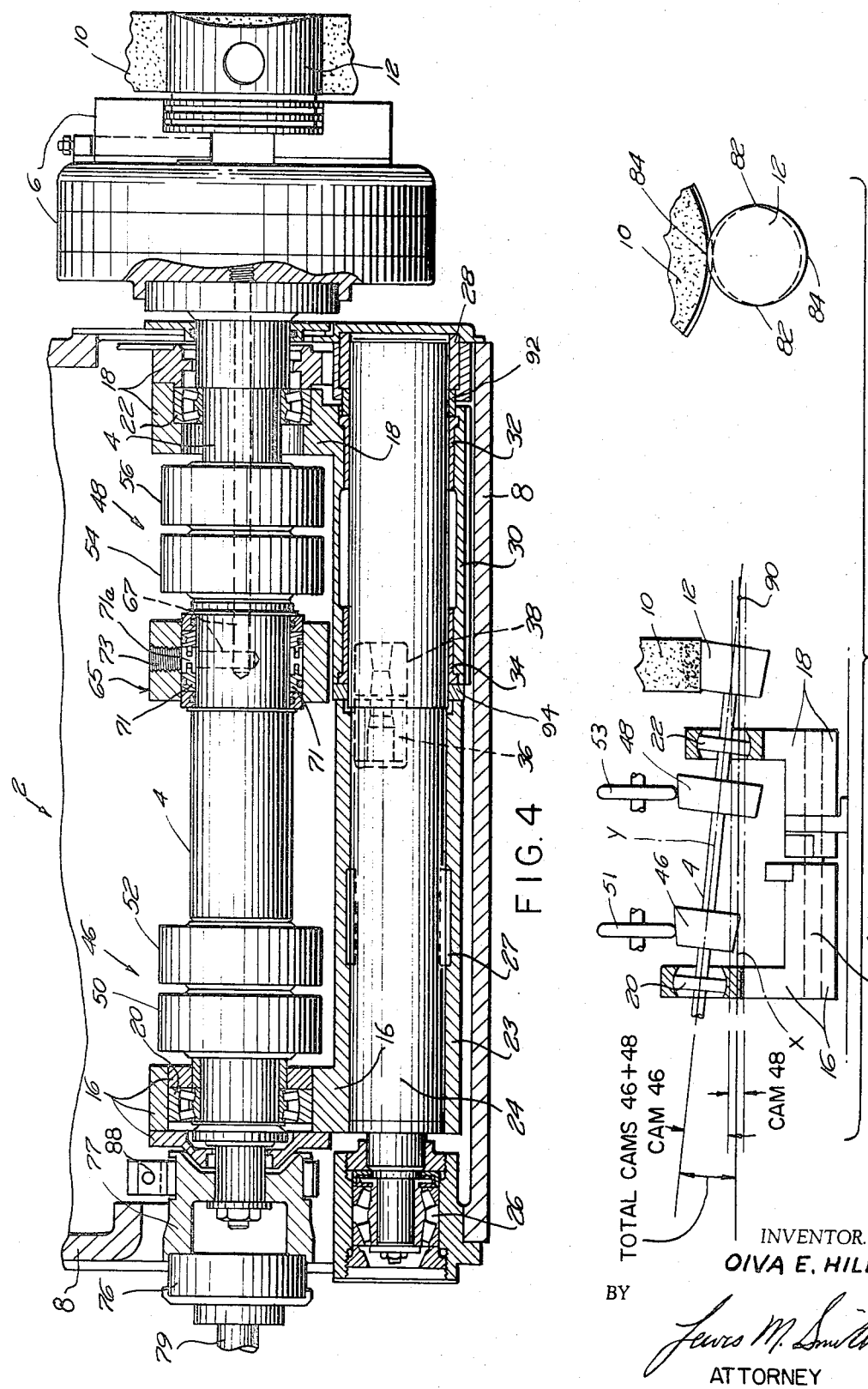
FIG. 4 is an enlarged view like FIG. 1 with certain portions omitted to better understand the manner in which the chuck supporting spindle is oscillated.

The spherical bearing 22 is preferably fully constrained against movement axially of the spindle 4 relative to rocker arm 18 by opposed shoulders on abutting interconnected sections of rocker arm 18 as shown in FIG. 4. Spherical bearing 20 is preferably relatively tightly seated in rocker arm 16 but otherwise not restrained against movement axially of the spindle relative to rocker arm 16. Angular displacement of the spindle is usually quite small, e.g., about 5 or 10 minutes of arc. Any resulting tendency to displace spherical bearing 20 axially of spindle 4 relative to rocker arm 16 may be accommodated by the thrust bearings 92 and 94 notwithstanding the fact that the rocker shaft 24 and sleeves 23 and 30 are preferably mounted with a minimum of end play.

Figure 5:
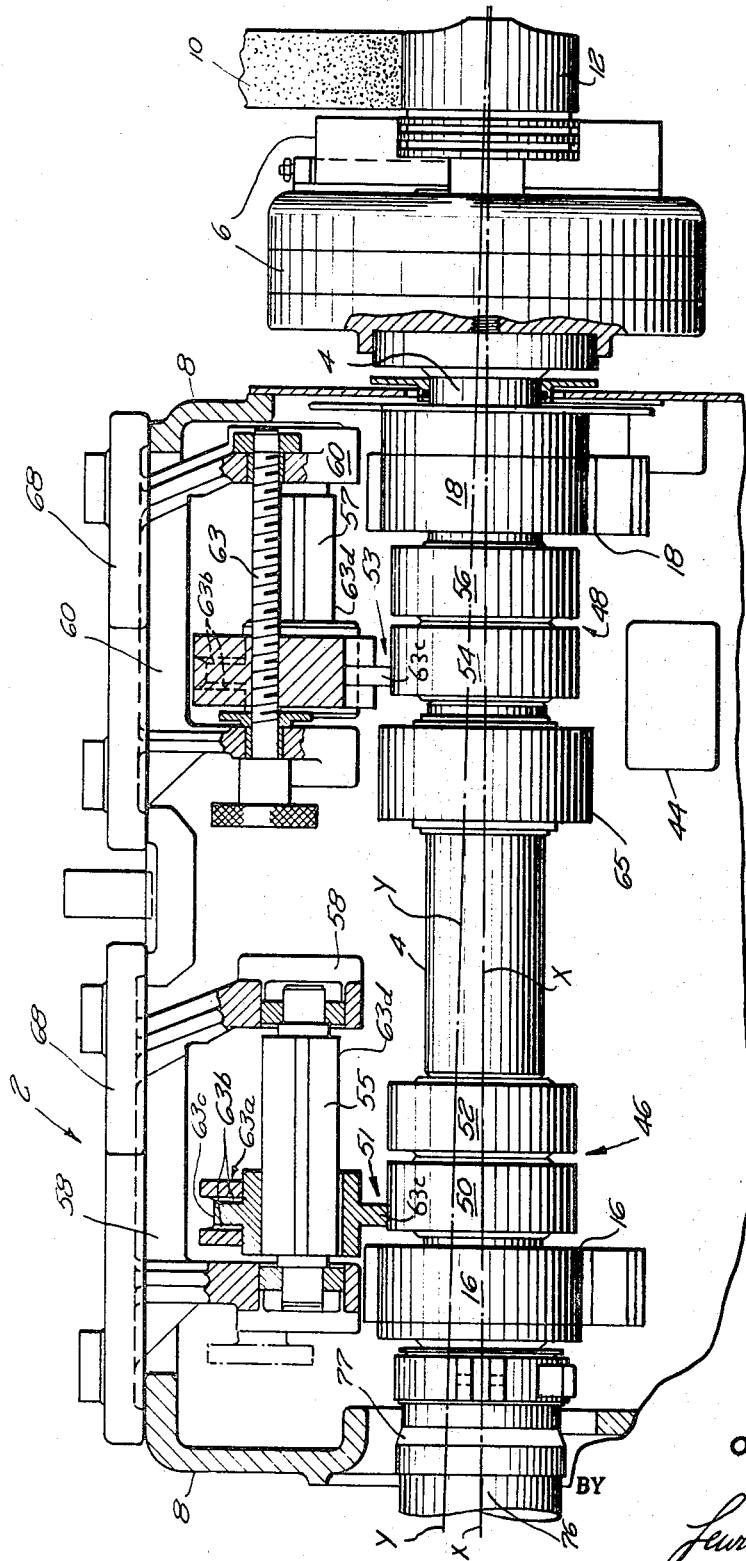
FIG. 5 is an enlarged view like FIG. 2 with certain portions omitted to better understand the manner in which the chuck supporting spindle is oscillated.

It is apparent that rotation of the spindle 4 will cause the center lines of the spindle 4 and piston 12 to oscillate about the imaginary point 90 (FIG. 6) between positions X and Y as shown in FIGS. 5 and 6, the particular oscillation and the particular location of the imaginary pivot point 90 depetnding on the contours of the cams 46 and 48.

The cams 46 and 48 are plotted to move the center lines from position X to position Y and back to position X, i.e., one complete oscillation, over every 180° of rotation of the cams, spindle 4 and piston 12, i.e., every half turn. Thus, there are two oscillations for every turn of the spindle.

With the cam followers 51 and 53 respectively operatively engaged by selected cams of the cam sets 46 and 48 and with rocker arm 18 not locked either to rocker arm 16 or to the housing 8, the oscillation achieved is the sum of the effects of cam sets 46 and 48 as shown in FIG. 6. The effect is to impart to the piston 12 the elliptical shape shown to the right in FIG. 6. The opposite sides 82 of the ground piston at the ends of the elongated cross sectional axes of the ellipse are straight whereas the curved elliptical surfaces 84 between the sides 82 are tapered or drop from end to end.

The reason for this is apparent when it is remembered that at the X position of the spindle center at the beginning and end of each oscillation during every half turn of the spindle, the center exes of the spindle 4 and piston 12 are parallel to the center axis of the rocker shaft 24 and to the center axis of the grinding wheel 10. In this position, the grinding wheel 10 is in contact with a side 82 of the piston so that the opposite sides 82 are straight. More specifically, at the X position, one side 82 is in contact with the grinding wheel. Oscillation from X to Y and from Y back to X occurs over the next half rotation of the spindle to thereby cause the piston to be held at an increasing angle from X to Y and at a decreasing angle from Y to X against the grinding wheel surface to provide the desired drop along one half of the piston surface. Upon completion of the half turn the other side 82 is held against the grinding wheel at X position. On the next half turn the other half of the piston is held at an increasing angle from X to Y and at a decreasing angle from Y back to X with respect to the grinding wheel surface to thereby impart a drop to the other half of the piston.

It is noted from FIG. 6 that the spindle is oscillated about the imaginary pivot point 90 which is located on a line extending beyond the center axis of the spindle 4 and which may be located beyond the end of the machine. This feature permits maximum flexibility in the amount of the drop or taper of the ground piston.

It will thus be seen that there has been provided by this invention apparatus in which the various objects hereinabove set forth together with many thoroughly practical advantages are successfully achieved. Since many possible embodiments may be made of the above invention and since many changes might be made in the embodiments above set forth, it is to be understood that all matter hereinbefore set forth, or shown in the accompanying drawings, is to be interpreted as illustrative and not in a limiting sense.

I claim:

1. In a machine tool for performing an operation on non-circular rotating workpieces, the improvement in a workpiece mounting, rotating and oscillating means comprising a rotatable elongated unitary spindle having means at one end thereof for holding a workpiece cantilevered therefrom, spaced first and second rocker arms independently rotatable about a common pivotal support and respectively rotatably supporting the opposite ends of said elongated unitary spindle, first and second fixedly positioned cam follower means spaced lengthwise along said elongated unitary spindle, first and second cam means spaced lengthwise along, encircling, and fixedly secured to said elongated unitary spindle, and biasing means operative to maintain said first cam means in operative engagement with said first cam follower means and said second cam means in operative engagement with said second cam follower means, while said elongated unitary spindle is rotated.

2. A device as described in claim 1, wherein said elongated unitary spindle is rotatably supported on said rocker arms by spherical self-aligning bearing means, one of which is fully constrained against movement axially of said elongated unitary spindle relative to the rocker arm in which it is supported.

3. In a cam grinding machine, workpiece supporting, positioning, and oscillating means comprising a chuck means for holding a workpiece cantilevered therefrom, an elongated single spindle supporting said chuck means at one end thereof for rotation therewith, a pair of rocker arms spaced lengthwise along said elongated single spindle, a rocker shaft on which said pair of rocker arms are pivotally mounted for independent oscillation of said rocker arms, means for rotatably mounting said elongated single spindle at the unsupported ends of said spaced rocker arms, said last mentioned means comprising self-aligning bearing means, a plurality of cam means spaced lengthwise of, encircling, and fixedly secured to said elongated single spindle, at least a pair of cam follower means spaced lengthwise of said elongated single spindle and selectively adjustable lengthwise of said spindle to engage predetermined peripheral surface portions of said cam means spaced lengthwise of said elongated single spindle, and biasing means operative to maintain one said cam means in engagement with one of said cam follower means and to maintain another of said cam means in engagement with another of said cam follower means, while said elongated single spindle, said chuck means, and a workpiece supported cantilevered therefrom are rotated.

References Cited

UNITED STATES PATENTS

| 2,279,902 | 4/1942 | Green | 51—101 |
| 2,599,987 | 6/1952 | Green | 51—101 |
| 2,721,423 | 10/1955 | Hanssler | 51—101 |
| 2,723,500 | 11/1955 | Narel | 51—101 |

ROBERT C. RIORDON, *Primary Examiner.*

D. G. KELLY, *Assistant Examiner.*

U.S. Cl. X.R.

51—105